United States Patent
Atli et al.

(10) Patent No.: US 11,701,576 B2
(45) Date of Patent: *Jul. 18, 2023

(54) MEDIATING MULTIPLAYER ELECTRONIC GAME SESSIONS

(71) Applicant: Bunch Live, Inc., New York, NY (US)

(72) Inventors: Selcuk Atli, San Francisco, CA (US); Jason Liang, Toronto (CA); Jordan Howlett, Toronto (CA)

(73) Assignee: BUNCH LIVE, INC., New York, NY (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/383,377

(22) Filed: Jul. 22, 2021

(65) Prior Publication Data

US 2021/0346791 A1    Nov. 11, 2021

Related U.S. Application Data

(63) Continuation of application No. 16/052,540, filed on Aug. 1, 2018, now Pat. No. 11,103,772.

(Continued)

(51) Int. Cl.
*A63F 13/216* (2014.01)
*A63F 13/213* (2014.01)
(Continued)

(52) U.S. Cl.
CPC .......... *A63F 13/216* (2014.09); *A63F 13/213* (2014.09); *A63F 13/35* (2014.09);
(Continued)

(58) Field of Classification Search
CPC ...... A63F 13/216; A63F 13/213; A63F 13/35; A63F 13/48; A63F 13/65; A63F 13/795;
(Continued)

(56) References Cited

U.S. PATENT DOCUMENTS

| 8,888,592 B1 | 11/2014 | Pereira et al. |
| 9,713,765 B2 | 7/2017 | Jung |

(Continued)

FOREIGN PATENT DOCUMENTS

KR    10-2018-0077355 A    7/2018

OTHER PUBLICATIONS

United States Office Action, U.S. Appl. No. 16/841,501, dated Sep. 20, 2021, 10 pages.

(Continued)

*Primary Examiner* — William H McCulloch, Jr.
*Assistant Examiner* — Ankit B Doshi
(74) *Attorney, Agent, or Firm* — Fenwick & West LLP

(57) ABSTRACT

An environment includes one or more clients, a game mediator server, and a game server connected by a network. The clients include a game mediator and a game. The game server executes game playing sessions of the games. The game mediator server and the game mediators form a game mediation infrastructure to mediate game playing sessions. For example, the game mediation infrastructure creates "lobbies" for game playing sessions and enables clients connected to lobbies to communicate with one another. The games receive interactions at the client and communicate with the game server to impact execution of game playing sessions. The game mediator server sends deep links to clients, e.g., to initiate game installation, or to start the game at a particular portion of the game. The game mediation infrastructure may also enrich gameplay by customizing gameplay and/or the lobby, e.g. based on events that occur during execution of the game playing session, or locations of the clients.

20 Claims, 8 Drawing Sheets

Related U.S. Application Data

(60) Provisional application No. 62/616,972, filed on Jan. 12, 2018.

(51) Int. Cl.
| | |
|---|---|
| *G06F 3/01* | (2006.01) |
| *A63F 13/65* | (2014.01) |
| *A63F 13/35* | (2014.01) |
| *A63F 13/424* | (2014.01) |
| *G06F 3/0346* | (2013.01) |
| *A63F 13/48* | (2014.01) |
| *A63F 13/795* | (2014.01) |
| *A63F 13/86* | (2014.01) |

(52) U.S. Cl.
CPC ............ *A63F 13/424* (2014.09); *A63F 13/48* (2014.09); *A63F 13/65* (2014.09); *A63F 13/795* (2014.09); *A63F 13/86* (2014.09); *G06F 3/017* (2013.01); *G06F 3/0346* (2013.01); *G06F 2203/04803* (2013.01)

(58) Field of Classification Search
CPC ...... A63F 13/86; A62F 13/424; G06F 13/795; G06F 3/017; G06F 3/0346
See application file for complete search history.

(56) References Cited

U.S. PATENT DOCUMENTS

| | | |
|---|---|---|
| 2007/0078000 A1 | 4/2007 | Saund et al. |
| 2009/0006604 A1 | 1/2009 | Dhupelia et al. |
| 2009/0291761 A1 | 11/2009 | Hata |
| 2009/0318224 A1 | 12/2009 | Ealey |
| 2010/0041457 A1 | 2/2010 | Cook et al. |
| 2012/0283023 A1 | 11/2012 | O'Kelley et al. |
| 2012/0297348 A1 | 11/2012 | Santoro |
| 2013/0231129 A1 | 9/2013 | Saville |
| 2013/0296048 A1 | 11/2013 | Jeffery et al. |
| 2014/0045589 A1 | 2/2014 | Paradise et al. |
| 2014/0280137 A1 | 9/2014 | Anderson et al. |
| 2014/0304328 A1 | 10/2014 | Capati et al. |
| 2015/0261496 A1 | 9/2015 | Faaborg et al. |
| 2015/0268717 A1 | 9/2015 | Schlumberger et al. |
| 2015/0328549 A1 | 11/2015 | Tanaka |
| 2015/0347486 A1 | 12/2015 | Julia et al. |
| 2016/0082353 A1 | 3/2016 | Christovale |
| 2016/0166923 A1* | 6/2016 | Raj .................... A63F 13/69 463/31 |
| 2016/0184712 A1 | 6/2016 | Colenbrander |
| 2016/0370882 A1 | 12/2016 | McGrath et al. |
| 2017/0028299 A1 | 2/2017 | The et al. |
| 2017/0113146 A1* | 4/2017 | Chung .................... A63F 13/35 |
| 2017/0136347 A1 | 5/2017 | Prasad et al. |
| 2017/0157511 A1 | 6/2017 | Feghali |
| 2017/0266549 A1 | 9/2017 | Paradise |
| 2017/0266564 A1 | 9/2017 | Choudhuri |
| 2018/0088792 A1 | 3/2018 | Klein et al. |
| 2019/0014206 A1 | 1/2019 | Kuhn et al. |
| 2019/0091544 A1 | 3/2019 | Huang |
| 2019/0158484 A1 | 5/2019 | Grunewald et al. |
| 2019/0217205 A1 | 7/2019 | Atli et al. |
| 2019/0329134 A1 | 10/2019 | Shriram et al. |
| 2020/0090463 A1 | 3/2020 | Mohrhardt et al. |
| 2021/0205715 A1 | 7/2021 | Boudville |

OTHER PUBLICATIONS

United States Office Action, U.S. Appl. No. 16/841,501, dated Sep. 30, 2022, 13 pages.

United States Office Action, U.S. Appl. No. 16/841,501, dated Feb. 16, 2022, 11 pages.

Deep linking-Wikipedia, "Deep linking," 2018, 4 pages [Online] [Retrieved Nov. 20, 2018], Retrieved from the internet <URL:https://en.wikipedia.org/wiki/Deep linking>.

PCT International Search Report and Written Opinion, PCT Application No. PCT/US2019/013532, dated May 7, 2019, 11 pages.

PCT International Search Report and Written Opinion, PCT Application No. PCT/US2020/029184, dated Jul. 30, 2020, 12 pages.

United States Office Action, U.S. Appl. No. 16/052,540, dated Sep. 23, 2020, 10 pages.

Empson, R. "Overwolf Partners with TeamSpeak to Give Games a Social Boost (and In-Game Voice Chat)." TechCrunch.com, Dec. 14, 2011, 18 pages, [Online] [Retrieved Oct. 22, 2021], Retrieved from the Internet <URL:https://techcrunch.com/2011/12/14/overwolf-partners-with-teamspeak-to-give-online-games-a-social-boost-and-in-game-voice-chat/>.

Overwolf. "Overwolf API." Developers.overwolf.com, Sep. 21, 2017, 6 pages, [Online] [Retrieved Oct. 22, 2021], Retrieved from the Internet Archive <URL:https://web.archive.org/web/20170921182633/http://developers.overwolf.com/documentation/sdk/overwolf/>.

Overwolf. "Overwolf's TeamSpeak Overlay." YouTube.com, Dec. 12, 2011, 1 page, Timestamp: 0:32, [Online] [Retrieved Oct. 22, 2021], Retrieved from the Internet <https://www.youtube.com/watch?v=J6AEeypXTDc>.

United States Office Action, U.S. Appl. No. 16/843,836, dated Oct. 29, 2021, 15 pages.

* cited by examiner

MEDIATING MULTIPLAYER ELECTRONIC GAME SESSIONS

RELATED APPLICATIONS

This application is a continuation of U.S. patent application Ser. No. 16/052,540, filed Aug. 1, 2018, which claims the benefit of Provisional Application No. 62/616,972, filed on Jan. 12, 2018, both of which are incorporated herein by reference.

BACKGROUND

1. Field of the Invention

This invention pertains to mediating multiplayer electronic game sessions.

2. Description of the Related Art

Many electronic games allow for multiplayer gameplay where players can play together or compete with one another within a session of the game. Some electronic games allow multiplayer gameplay to involve multiple devices each running a copy of the game. Often, coordination of multiplayer gameplay among players can be difficult. For example, the players may not be able to coordinate to launch a game together; the players may get lost in in-game navigation and controls; some players may lack a copy of the game on their devices; or players may be unable to communicate in real time if they are not within speaking distance of each other. Furthermore, players may find multiplayer gameplay to lack sufficient interaction between the players.

SUMMARY

An environment includes one or more clients, a game mediator server, and a game server connected by a network. Each client includes a game mediator and a game. The game server executes game playing sessions of the games. The game mediator server and the game mediators form a game mediation infrastructure to mediate game playing sessions. For example, the game mediation infrastructure creates "lobbies" for game playing sessions and enables clients connected to lobbies to communicate with one another. The games receive interactions at the client and communicate with the game server to impact execution of game playing sessions.

In an embodiment, a method involves a first client launching a game mediator and selecting a game. The game mediator server configures a lobby for the selected game. The first client invites a second client to the lobby. The second client joins the lobby. The first client instructs the game mediator server to launch the game. The game mediator server checks the lobby members and sends a deep link to the second client. Deep links link to a resource such as a game, and additionally specify a more specific context within the resource, such as a particular stage or state of the game. The second client installs the game. The game mediator server suggests to the first client that the first client invite additional clients to the lobby. The first client declines inviting additional clients. The game mediator server launches the game by communicating with the game server. The game server begins executing a game playing session.

In an embodiment, a method involves a first client launching a game mediator and initiating a lobby. The game mediator creates the lobby. The first client invites a second client to the lobby. The second client joins the lobby. The first client selects a game. The game mediator server configures the lobby for the game. The first client instructs the game mediator server to launch the game. The game mediator server verifies whether the clients have the game installed, and upon determining that the second client does not have the game installed, sends a deep link to the second client, which installs the game. The game mediator server suggests to the first client that the first client invite additional clients to the lobby. The first client declines to invite additional clients. The game mediator server instructs the game server to launch a game playing session. The game server begins the game playing session.

In an embodiment, the game mediation infrastructure enriches gameplay by customizing gameplay and/or the lobby based on events that occur during execution of the game playing session. Gameplay may also be enriched by determining a location of a plurality of clients in a lobby. If two or more of the plurality of clients are within a threshold distance of one another, the game mediation infrastructure customizes the gameplay accordingly, such as by adjusting the volume of one or more of the clients.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
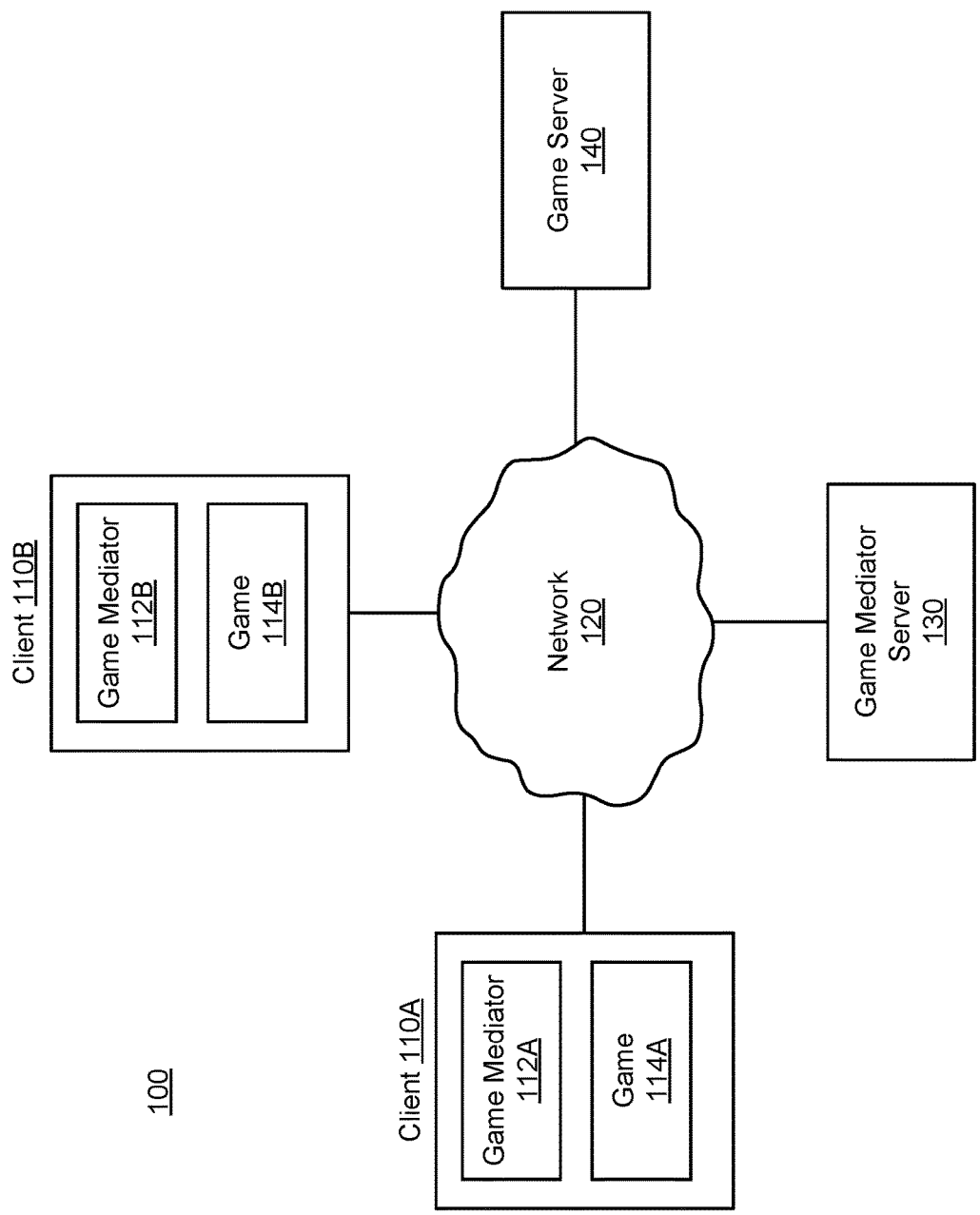
FIG. 1 is a high-level block diagram illustrating a game mediation environment, according to one embodiment.

FIG. 1 is a high-level block diagram illustrating an environment 100 in which game mediation takes place, according to one embodiment. FIG. 1 illustrates two clients 110A and 110B, a game mediator server 130, and a game server 140 connected by a network 120. Only two clients 110, one game mediator server 130, and one game server 140 are shown in FIG. 1 in order to simplify and clarify the description. Embodiments of the computing environment 100 can have many clients 110, game mediator servers 130, and game servers 140 connected to the network 120. Likewise, the functions performed by the various entities of FIG. 1 may differ in different embodiments.

FIG. 1 uses like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A" and/or "110B" in the figures.

A client 110 is an electronic device used by a user to perform functions such as communication with other clients, executing software applications for various purposes, and consuming electronic content such as content hosted by web servers on the network 120. For example, the client may be a smart phone, or a tablet or notebook computer. The client 110 includes a display on which the user may view content such as electronic games. In addition, the client 110 includes a user interface (UI), such as physical and/or on-screen buttons, which the user may interact with to perform various functions with the client.

The client 110 includes a game mediator 112 and an electronic game 114. Depending upon the embodiment, the game mediator 112 and/or game 114 may be integrated into the operating system, or implemented as an application or other software executing on the client 110. In some embodiments, the game 114 is part of the game mediator 112, rather than an independent software item. In other embodiments, the game 114 is distributed among a plurality of locations, for example, in part on the client 110 as an independent software item, and in part on the game server 140.

The game mediator 112 runs on the client 110 and mediates multiplayer gameplay. The game mediator 112 interacts with one or more games such as game 114 as well as the game mediator server 130. The game mediation infrastructure used to enable game sessions includes at least the game mediator 112, and in some embodiments also includes the game mediation server 130 and/or at least one other game mediator 112 upon at least one other client 110. Depending upon the embodiment, the game mediation infrastructure controls various aspects of a game playing session, for example, launching a "lobby" for the game playing session, and providing enriched gameplay. In one embodiment, a game playing session may be launched via a UI of the game mediator 112, such as the lobby, using a "deep link" (a link, such as a Uniform Resource Locator (URL), to a resource such as a game, and that additionally specifies a more specific context within the resource, such as a particular stage or state of the game). In an embodiment, the game mediator 112 runs on a first client 110A and interacts with a second client 110B, such as with a game mediator 112B upon the second client 110B, to enable client 110B to participate in the game playing session launched by client 110A. In other embodiments, more than one client 110 may be interacted with by client 110A to enable participation in the game playing session launched by client 110A, e.g., up to as many as the game being played supports. The lobby is a user interface that provides an environment for communication for clients 110 associated with a game playing session. The lobby allows clients 110 to communicate before, during, and/or after game playing sessions, such as by using live video feeds and/or voice. In an embodiment, the lobby has functionality allowing at least one client 110 to configure game play settings of the game that is to be launched. In an embodiment, the lobby is executed at least in part upon the game mediator server 130. The lobby may further include various information about the game playing session, such as usernames or rankings of clients 110 for the game, as well as a level of the game or other information pertaining to the game playing session. For example, in some embodiments the lobby includes a chatroom in which client 110A exchanges text messages with client 110B. Alternatively or additionally, as another example, in some embodiments the lobby includes a video call (using live video feeds) with which users of clients 110 see and hear each other.

Figure 7:
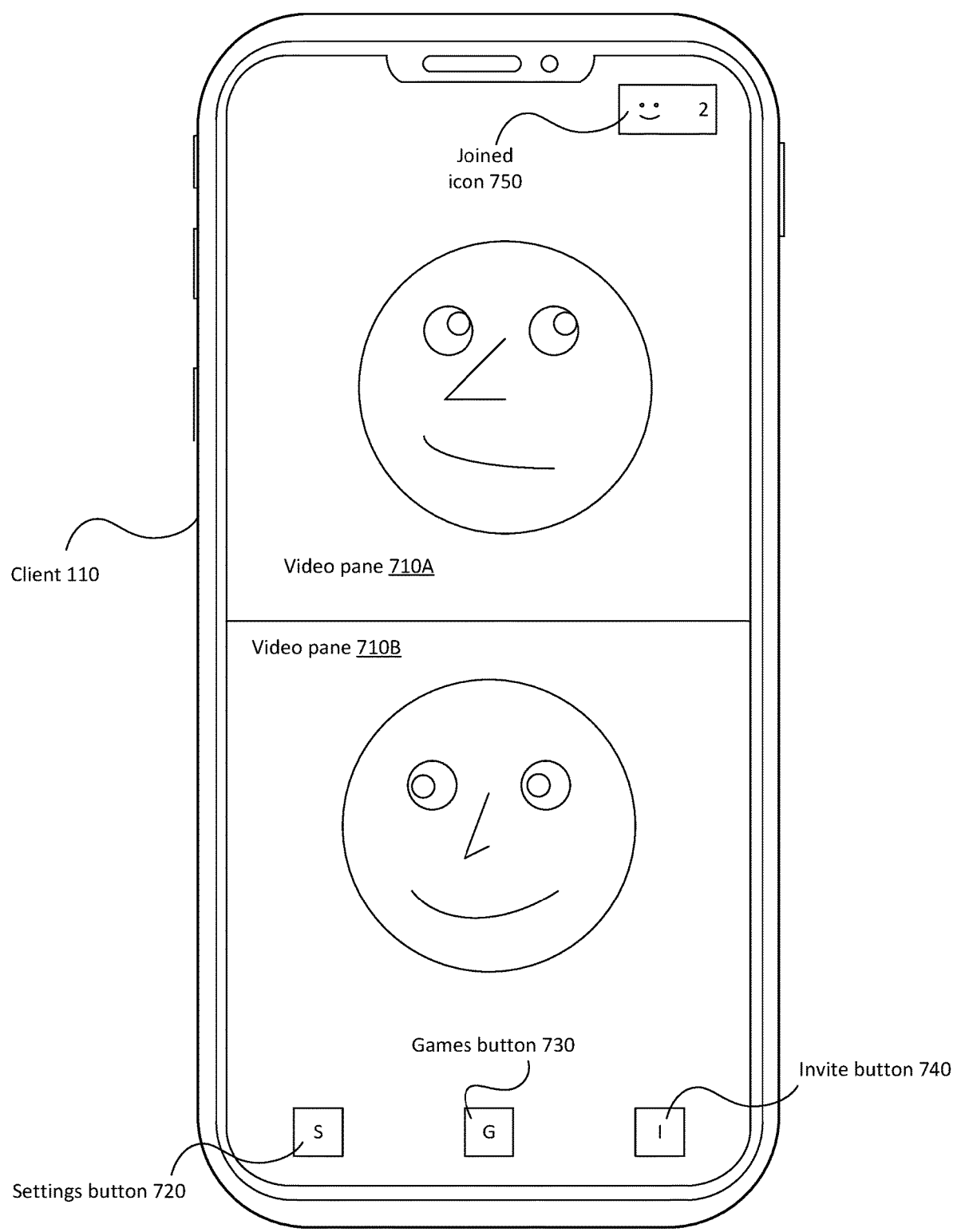
FIG. 7 illustrates a simplified example of a lobby according to one embodiment.

FIG. 7 illustrates a simplified example of the lobby according to one embodiment, the lobby including video panes 710, a settings button 720, a games button 730, an invite button 740, and a joined icon 750. The lobby is a page or screen of the game mediator 112, which runs upon client 110 and in the example of FIG. 7 is a mobile device. Each video pane 710 is associated with a client 110 joined to the lobby. For example, if clients 110A and 110B are joined to a lobby, there is a video pane 710A for client 110A and a video pane 710B for client 110B, as in FIG. 7. If additional clients 110 are joined to the lobby, additional panes may be added, which may involve modifying the boundaries of existing panes to accommodate the additional panes on the display. In an embodiment additional panes are not added if a pane threshold is reached or surpassed. For example, the pane threshold may be a number of panes, or a pane size. Each video pane 710 presents a live video feed from the associated client 110, including both graphical and audio content. The live video feed may be, for example, from a camera of the client 110, e.g., displaying an image of the user of the client (or of whatever is in the field of view of the camera). In an embodiment, the client 110 can disable the presentation of graphical and/or audio content of the client's 110 live video feed, for example, using the settings button 720. In an embodiment, the client 110 can change the camera used to generate the live video feed, such as switching from a front-facing camera to a rear-facing camera of the client 110.

The settings button 720 controls settings of the game mediator 112 according to one embodiment. For example, in some embodiments, upon selection of the settings button 720 by the client 110, the game mediator 112 loads a settings page. At the settings page, one or more settings may be adjusted using the client 110, such as enabling or disabling the transmission of audio and/or graphical content by the client 110, changing the camera used to generate the live video feed, muting one or more incoming live video feeds from other clients 110 joined to the lobby, and so on.

The games button 730 controls game selection in the game mediator 112 according to one embodiment. For example, upon selection of the games button 730 by the client 110, the game mediator 112 loads a games page listing the games available for play. At the games page, a game may be selected using the client 110. For example, the games page may include a list of available games, including for each listed game a game title, a game icon or image, a game summary, and/or an on-screen button to select the game. For example, a listed game may have title "Fortnite™," an image of a game character, and a summary "compete in a battle royale." In an embodiment, the games page further allows the client 110 to select a portion of the game they wish to play, such as a track where they wish to race within a car racing game, or a location upon a map where a user character should be placed upon loading.

Upon selection of a game by the client 110, the game mediator 112 configures the lobby to attain a look and feel of the selected game based on one or more features of the game. The lobby may be configured to display graphical and/or textual elements of the game, such as a logo, a color scheme, one or more images from the game, and so on. For example, if "Fortnite" is selected, an image from the game of a game character may be displayed with the "Fortnite" logo overlaid. Other aspects of the lobby, such as video panes 710, may adjust to accommodate the configuration, as seen in FIG. 8, which illustrates a simplified example of a lobby according to a second embodiment.

Figure 8:
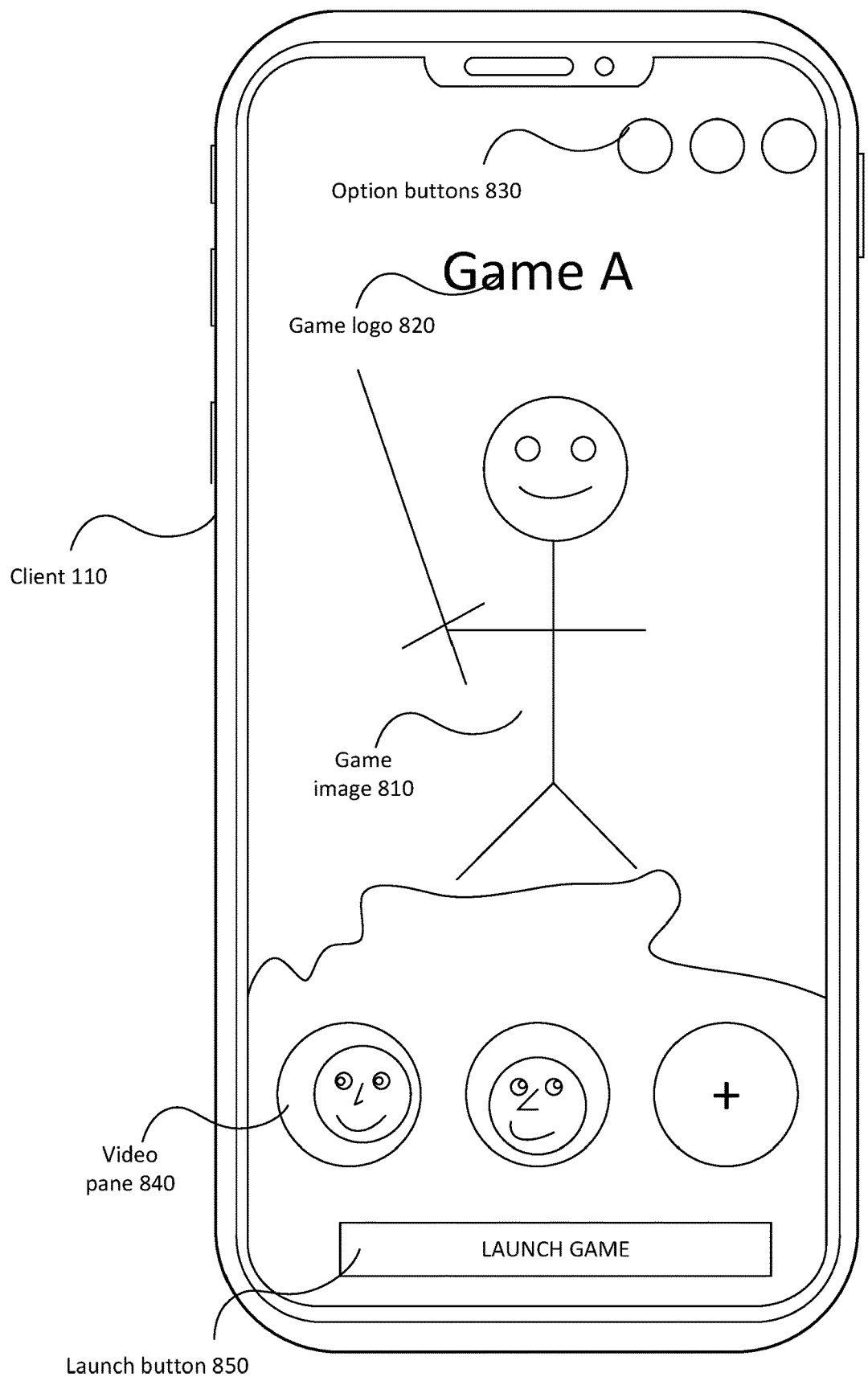
FIG. 8 illustrates a simplified example of a lobby according to a second embodiment.

FIG. 8 illustrates a different state of the lobby, e.g. after a game has been selected. FIG. 8 includes a game image 810, a game logo 820, option buttons 830, video pane 840, and launch button 850. The game image 810 is an image from game A, such as a game character holding a sword in a game landscape. The game logo 820 is the stylized title of the game, such as how it may appear in-game at a title screen. The option buttons 830 allow one or more settings to be adjusted, such as the transmission of audio and/or graphical content as part of a live video feed.

Video pane 840 is a video pane similar to video pane 710, though of different dimensions. In an embodiment each client 110 joined to the lobby is associated with a video pane that displays the associated client's 110 live video feed. In an embodiment there are as many video panes as there are allowed players for the game, and if there are fewer clients 110 joined to the lobby than there are allowed players for the game, unused video panes include an icon, such as a "+" icon, which the client 110 may select to access an invitation page as detailed below. The launch button 850 prompts the game mediator 112 to launch a game playing session, e.g. to initiate execution of the game playing session.

Returning to FIG. 7, the invite button 740 controls invitation of clients 110 to the lobby according to one embodiment. For example, upon selection of the invite button 740 by the client, the game mediator 112 loads an invitation page enabling a user of the client 110 to send invitations to join the lobby to other clients 110. For example, the invitation page may include a list of invitation techniques, including for each listed technique a technique title and a technique icon. For example, an iMessage™ listed technique may include the title "iMessage™" and an iMessage™ icon. The invitation page may also include a list of clients 110 to whom an invitation may be sent, each listed client 110 including, for example, a name. Upon selection of one or more clients 110 for invitation and selection of one or more invitation techniques, the game mediator 112 generates an invitation message and configures the selected invitation techniques such that the invitation message may be sent. For example, if the invitation technique is a text message and the invitee is a client 110 associated with the name "Justin," the game mediator 112 generates a textual invitation message, opens a text message application upon the client 110, addresses the text to the invitee, and pastes the invitation message into a message portion of the text message application. The client 110 may then send the invitation to the invitee using a button of the text message application.

The joined icon 750 indicates a number of clients 110 joined to the lobby. In the example of FIG. 7, there are two clients 110 joined to the lobby, hence the joined icon 750 indicates "2." In other embodiments, other icons may be present, as well as other buttons, graphical, and/or audio content. For example, the lobby may be configured to display a text string for each client 110 in the lobby indicating a name associated with the client 110. In an embodiment the lobby may include a list of other clients 110 that are playing games or are preparing to play games, which the client 110 may select to join another client's 110 lobby and/or game playing session.

In an embodiment, the lobby may be configured to allow the client 110 to initiate live streams of gameplay, using, for example, a livestream product such as Facebook Live™, YouTube™, or Twitch™. A live stream of gameplay involves sending a video of gameplay as seen on the screen of a client 110 playing in the game playing session to a client 110 not playing in the game playing session. Furthermore, clients 110 joined to the lobby or who select the lobby may choose to view the live stream, rather than participate in the game playing session. For example, if a game allows a maximum of four players and a fifth client 110 joints the lobby, the fifth client 110 may choose to livestream the game playing session despite being unable to play.

In an embodiment, a first client 110 may invite one or more additional clients 110 to a game playing session using the game mediator 112 via the game mediator server 130 (e.g., using the invite button 740 in the embodiment of FIG. 7). Upon receipt of an invitation, the game mediator 112 of each additional client prompts a user of the additional client 110 to either accept or reject the invitation. If the invitation is accepted, the game mediator server 130 may further interact with each accepting client 110 to enable participation in the game playing session. Furthermore, if the invitation is accepted, the respective client 110 is added to the lobby, for example, gaining the ability to participate in the chatroom.

Returning to FIG. 1, the electronic game 114 interacts with the game mediator 112 to provide game playing sessions to users of clients 110. The game 114 may be a dedicated software application built natively for the client 110, code (e.g., HTML 5 code) running within a game playing engine, such as (in some embodiments) the game mediator 112, a game built with a framework such as React Native™, or the like. A game playing session involves one or more users interacting with respective clients 110 to play a set of instances of the game 114 in coordination with each other. In multiplayer game playing sessions, multiple clients 110 participate in a single game playing session, interactively playing the same game. In single player game playing sessions, one client 110 participates in a single game playing session. In some embodiments, the game 114 runs on the game mediator server 130, and is accessed using the client 110 which provides an interface to play it. For example, the game 114 executes upon the game mediator server 130, which sends the results of the execution of the game 114 to the clients 110. Clients 110 interact with the results of the execution that are received from the game mediator server 130 and send the interactions to the game mediator server 130, which impact the execution of the game 114. The game playing session may progress in this back and forth manner.

There may be different types of games and the game mediator 112 and/or game mediator server 130 may support different types of games differently. One embodiment includes instant games and downloadable games. In such an embodiment, instant games can be played without downloading additional software. For example, the instant game may be at least partially integrated into the game mediator 112 such that the client 110 can launch a game without prior installation of additional software. If the client 110 launches a game playing session using the game mediator 112 for an instant game, the game mediator 112 does not check whether the client 110 has the game installed. In contrast, downloadable games require the downloading of the game by the client 110 before a game playing session can be launched. If the client 110 launches a game playing session using the game mediator 112 for a downloadable game, the game mediator 112 may check if the client 110 has the game installed.

The game mediator server 130 interacts with clients 110 to support the operation of the game mediator 112. The game mediator server 130 configures the lobby launched by the game mediator 112 according to specifics of the game 114 launched in conjunction with the lobby. For example, the lobby may be configured to show which players are prepared to play a particular game, allow a user to invite other players or to initiate a live stream of game play, and to allow a user to enable configuration of gameplay settings specific to the game 114 (such as selecting a character to use, or arena in which to play).

Upon receiving a command to launch a game playing session, the game mediator 112 alerts the game mediator server 130, which checks each client 110 involved in the game playing session. If a certain client 110 involved in the game playing session does not have the game installed, the game mediator server 130 sends a deep link to the certain client 110, e.g., a deep link to an application store such as Apple App Store™ or Google Play Store™. The deep link then initiates installation of the game on the certain client 110 without exiting the game mediator 112. Alternatively, the deep link is sent to each client 110 involved in the game playing session regardless of whether the client 110 has the game installed or not. If the game is not installed, the deep link facilitates the installation of the game without the user leaving the lobby. The deep link is a uniform resource locator (URL). In an embodiment, the deep link directs the client 110 to open an application vendor (e.g., an application store) to a page where the game may be downloaded, for example, in a web view of the game mediator 112. For example, the deep link includes an identifier associated with the page of the application vendor that is used by the client 110 to navigate to the page. In another embodiment, the deep link facilitates checking whether the game includes a game mediator software development kit (SDK). If client 110 and/or game mediator server 130, facilitated by the deep link, determines the game has the SDK, it transfers functionality to the game; for example, it may transfer voice and/or video stream controls to the game. Such a transfer allows the user to control various aspects of voice and/or video during gameplay without having to return to the lobby. In other embodiments, other functionality may be transferred to the game, such as livestream functionality, game invitation functionality, and so on. In such embodiments, one or more graphical elements, such as on-screen buttons with which a client 110 may interact to control functionality passed to the game, may be overlaid upon the game as it is displayed in the course of the game playing session. Furthermore, launching the game itself may involve the use of a deep link to access the game directly from the game mediator 112.

Furthermore, in some embodiments the game mediator server 130 checks the state of the lobby and, depending upon the number of clients 110 participating in the lobby, suggests to the client 110 who invited the others that more clients 110 could be invited. In an embodiment, the game mediator server 130 hosts the lobby. In an embodiment, when the game mediator server 130 configures the lobby according to the specifics of the game 114, the game 114 specifies the number of players required to play the game, which the lobby adapts to. For example, the lobby adapts to not launch a gameplay session until the required number of players are in the lobby. In an embodiment, if the minimum number of players are not present in the lobby to launch a game playing session, the lobby prompts the players to invite others. Furthermore, the lobby may be configured to display as many video panes as the game allows.

In some embodiments, lobbies may be private or public. In an embodiment, the player who created the game playing session sets the lobby as private or public. A public lobby is discoverable by users who wish to join a game. A private lobby is accessible only via invitation. Furthermore, the lobby may be configured to allow players who join the lobby to elect to participate in the game playing session as spectators. Spectators watch gameplay but do not themselves play. If a game has reached its maximum amount of players, additional players may only participate as spectators.

The game mediator server 130 proceeds to launch the game after receiving notifications that each client 110 sent a deep link installed the game and receiving a notification that the client who commanded launching the game playing session declined to invite more clients 110. In an embodiment, the game is hosted on the game server 140 and the game mediator server 130 sends the game server 140 parameters associated with the game playing session, such as a session identifier, as well as parameters associated with each client 110, such as client identifiers. In other embodiments, parameters associated with the game playing session are sent to one or more other destinations to coordinate game play.

The game mediator 112 uses client 110 functionality to enhance gameplay. The game mediator 112 may enable actions within the game mediator 112, such as in the lobby, to affect gameplay, or may enable actions within the game to affect the lobby. The game mediator 112 has access to the functionality of the client, further detailed in FIG. 2 below. Games such as game 114 may use the functionality of the client 110 via the game mediator 112 by way of the game SDK/engine 230. For example, games may access video content of clients 110 using the live video streams of the clients 110 in the lobby participating in the game playing session.

The game mediator 112 may enhance gameplay using the audio content of live video streams of clients 110 in the lobby participating in the game playing session. Game events may be associated with audio cues, which the game mediator 112 detects and communicates to the game via the game SDK/engine 230. Game events are associated with audio cues on a subscription basis. For example, in a charades game, each word in a set of candidate words is subscribed to a different audio cue which the game mediator 112 is set to detect depending upon which word is being guessed. If the word is "car" for example, the game mediator 112 listens for the word "car" and informs the charades game that it has been spoken. In an embodiment, the game mediator 112 also informs the game which client 110 produced the audio cue. The audio content may also be used for voice recognition. For example, if multiple players are speaking, and one says the correct keyword, the correct player is awarded a point.

In some embodiments, the graphical content of live video streams of clients 110 in the lobby participating in the game playing session may be used for gesture recognition to enrich gameplay, i.e., detecting (or subscribing to and then being notified by the game mediator 112 of) certain gestures, such as smiles, and awarding points to appropriately gesturing users within a game responsive to detection of those gestures. As another example, if a particular client 110 participating in a game playing session chooses to overlay a graphic of a wolf's face upon its video pane in the lobby, its character within the game could likewise gain a wolf façade.

In an embodiment the game mediator server 130 uses external livestreaming, rather than the content of live video streams within the lobby, to enhance gameplay. For example, in a pictorial guessing game, the livestream (such as on Facebook Live™ or Twitch™) may be used for players, i.e. viewers of the livestream, to guess what the picture is. The game 114 subscribes to the game mediator 112 to listen for certain keywords and upon detection of those keywords award points appropriately to the participant who guessed correctly by saying the keyword, similar to the use of audio content of the live video streams of clients 110 in the lobby.

In some embodiments, the game mediator server 130 provides enriched gameplay functionality by enabling game events to affect the lobby. Game events may be tagged for game mediator 112 enrichment using the game SDK/engine 230. Upon occurrence of the game event within the game playing session, the lobby is adjusted based on the tagged event. Depending upon the embodiment, the lobby may be adjusted by affecting one or more video panes, audio, or so on. For example, upon an event involving a wolf occurring within the game playing session, the client 110 who prompted the event may have a wolf mask graphic overlaid upon their video pane in the lobby. As another example, a player's audio content may be filtered to create an audio effect, such as filtering a voice to sound like a dog barking. As a third example, if the game mediator server 130 determines that two clients 110 are within a threshold geographical distance of each other, it could send a command to one of the two clients 110 to mute the volume of the game (or of specific portions of the game, such as background music, or the audio content of the live video stream) so as not to have duplicative sound played within a given area. In some embodiments, to determine the geographical distance between clients, the game mediator server obtains and analyzes device sensor data from the clients 110, such as their geolocations (e.g., distance between GPS coordinates) and/or speaker input (e.g., whether there is an echo or other duplicative sounds of the game). In other embodiments, enriched gameplay functionality is provided by the game mediators 112 collaborating in a peer-to-peer configuration, without the use of the game mediator server 130.

The game mediator server 130 and/or the game mediators 112 may further use deep links for purposes other than game installation or gameplay initialization. For example, the game mediator server 130 may obtain information about the gameplay preferences of the user of a client 110 by using deep links to send requests to each of some set of games, such as a predetermined set of games representative of various categories of game The operating system of the client 110 attempts to relay the deep link request to the applications; if the applications are not installed on the client, the operating system informs the game mediator 112 of an error. The game mediator 112 then stores (e.g., as a bit vector) whether each of the games of the set is installed based on whether the operating system indicated an error in response to the sending of the deep link requests. In some embodiments, the game mediator 112 further makes decisions or identifies implicit preferences for a particular client 110 based on which of the set of games is installed on that client. For example, the game mediator 112 might determine, based on the set of games installed on a given client 110, that the user of that client primarily enjoys puzzle games, and adjust the order of the games available to play, or the look and feel of the lobby, to reflect the user's interest in puzzle games. The game mediator 112 may also identify users connected to the user associated with the client 110, e.g. friends of the user, who also enjoy games of the type determined to be the user's preference. The game mediator 112 may suggest to the user that the user invite the identified friends to a game. Alternatively, the game mediator 112 may find other users who the user is not connected to (e.g., has never played with) who enjoy similar games, and may recommend to the user that the user play with the found other users. Furthermore, the game mediator 112 may use the user's preference to suggest additional games, e.g. games of the same type, that the user may enjoy playing. The game mediator 112 may also use the user's preferences when determining an advertisement or other sponsored content to display to the user. These various actions may be performed using deep links, e.g. by collecting data on the client 110 as the client 110 uses deep links, as described below, and developing implicit preferences for the client 110.

Deep links can indicate a particular application to run via the domain portion of the URL, and additional information for the application via the parameters of the URL. For example, to initiate a game on a client running the IOS™ operating system, a deep link "https://abcd.app.link/connect?mode=internet&teamPassword: 12345&bunchRoom=rkHyuCoj z &bunchAuth=SJWpHXZzX" might be used, where "https://abcd.app.link" indicates the application, and "mode=internet&teamPassword: 12345&bunchRoom=rkHyuCojz&bunchAuth=SJW/pHXZzX" indicates the game parameters, which in this example are "mode," "teamPassword," "bunchRoom," and "bunchAuth." Using this link, a client 110 may launch a game "abcd" over the internet with other clients 110 as part of a team, which may be joined to a lobby specified by the "bunchRoom" and authorized using the "bunchAuth." Additional parameters may be added in this manner to the deep link, such that each game may have a customized deep link to enable various gameplay customizations to launch the game with using the game mediator 112. For example, the deep link may additionally include a "skin" parameter used to specify a particular character graphic to use in the game. As a second example, the deep link may additionally include a "level" parameter used to specify a particular level of the game in to which to launch.

In an embodiment, one or more parameters are encoded (e.g., into a base 64 payload), such as that in the deep link "https://abcd.onelink.me/4289444349?payload=eyJhY3Rpbi24iOiJidW5jaC5yb29tIiwiZ2FtZVR 5cGUi0jEsInJvb21Ub2t1biI6InkSHl1Q29qeiJ9& bunchUID=rgBU5KlNmWhL7Od0NOGM4k WfEXD3&bunchRoom=rkHyuCojz&bunchAuth= SJWpHXZzX", where the data in the "payload" parameter can be decoded to obtain other parameter values. The use of base 64 encoding provides flexibility to the type of data transmitted to games. For example, the base 64 encoding could encode a JSON file, an image, or so on.

As another example, to initiate downloading a game, a deep link "https://itunes.apple.com/us/app/id570510529?mt=8" might be used, where "https://itunes.apple.com/us/" indicates the application store ITUNES™, and "app/id570510529?mt=8" indicates an application identifier used to specify the game to be downloaded. As a still further example, to check whether a game is installed on a client 110, a deep link "abcd://" might be used to determine whether the game is stored in memory upon the client 110. For example, if the deep link does not lead to a folder in memory, the game mediator 112 may determine that the game is not installed.

In some embodiments, the game is hosted by the game server 140, which runs the game playing session. Each game 114 interacts with the game which is run on the game server 140 to generate the game experience on the clients 110. For example, if a user playing a game on a client 110 performs an action within the game, the action is communicated to the game server 140 which handles that action and applies it to the corresponding game session, populating that action and its effects to any other clients 110/game mediators 112 which are participating in that session. Upon occurrence of events associated with enriched gameplay functionality (such as an in-game interaction with a certain game character), the game server 140 notifies the game mediator server 130 of the event and the client 110 which triggered the event. In an embodiment, the game mediator server 130 tracks the game session and identifies events with enriched gameplay functionality.

The network 120 enables communications among the clients 110, the game mediator server 130, and the game server 140, and can comprise the Internet as well as mobile telephone networks. In one embodiment, the network 120 uses standard communications technologies and/or protocols. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The entities can use custom and/or dedicated data communications technologies instead of, or in addition to, the ones described above.

Figure 2:
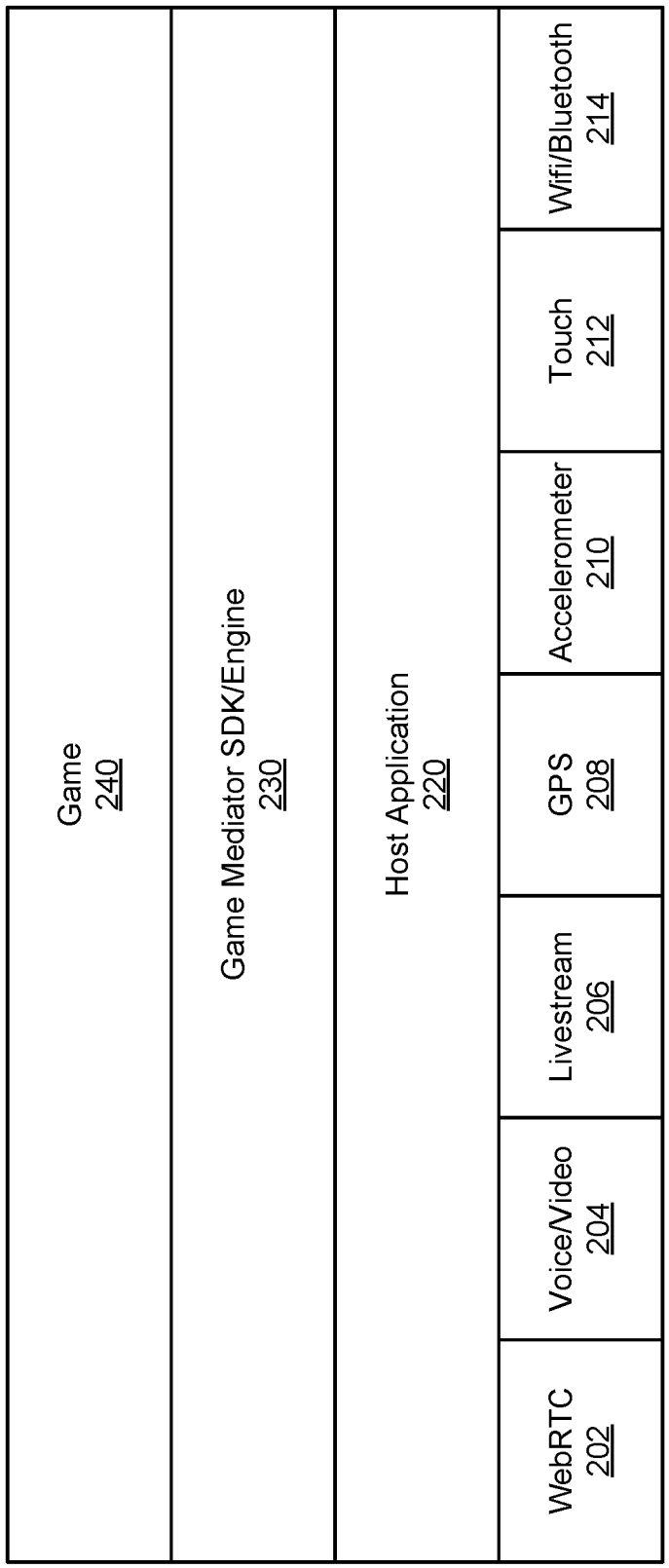
FIG. 2 is a high-level block diagram of a software stack upon which the game mediation system operates, in one embodiment.

FIG. 2 is a high-level block diagram of the software stack upon which the game mediation infrastructure operates, in one embodiment. At a first or bottom layer reside software components which drive low level functionality including hardware functionality, including WebRTC 202, Voice/Video 204, Livestream 206, GPS 208, Accelerometer 210, Touch 212, and Wifi/Bluetooth 214. At a second layer resides software which drives a host application 220, such as an operating system. At a third layer resides a game mediator software development kit (SDK)/Engine 230. At a fourth or top layer resides a game 240 (e.g., a game 114 of FIG. 1).

The WebRTC 202 component enables web browsers to communicate in real time. The Voice/Video 204 component enables use of audio and/or video capabilities of the client device 110. The Livestream 206 component allows for communication of video in real time. The GPS 208 component provides location information of the client device 110. The Accelerometer 210 component provides acceleration information of the client device 110. The Touch 212 component enables touch input to the client device 110. The Wifi/Bluetooth 214 component enables Wifi and/or Bluetooth functionality to the client device 110.

The host application 220 manages operation of the client 110 and its software and hardware components. The game mediator SDK/engine 230 is a software framework used to develop the game mediator 112 and game 240, such as game 114, allowing for the interactivity needed to enable mediated and/or enriched gameplay sessions. In some embodiments, the game mediator 112 and game 240 are managed by the host application 220. For example, the host application 220 allocates memory for both the game mediator 112 and the game 240.

Figure 3:
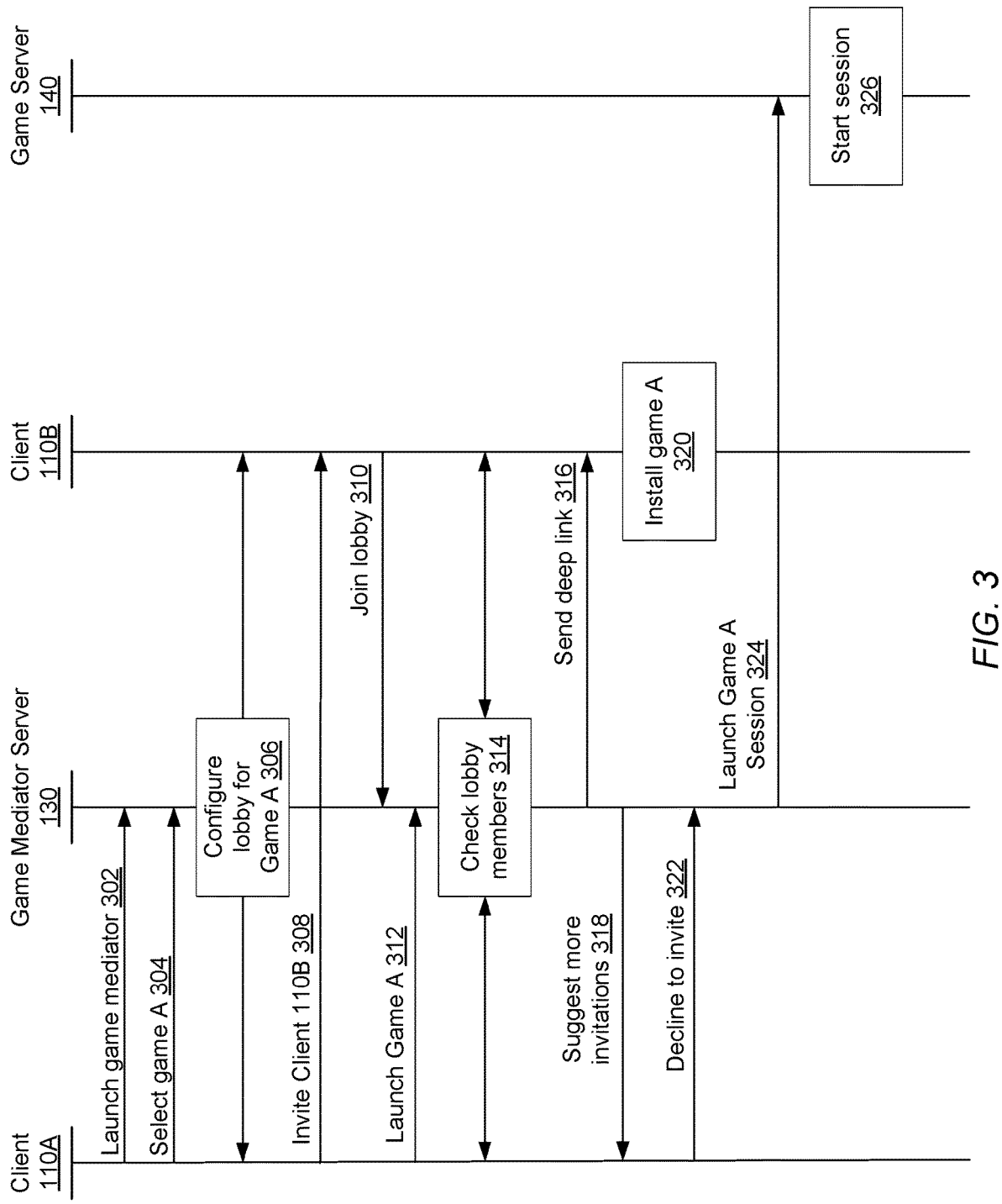
FIG. 3 illustrates a process of launching a multiplayer game playing session using the game mediation system, in one embodiment.

FIG. 3 illustrates the process of launching a multiplayer game playing session using the game mediation system 100, in one embodiment. In this embodiment, the game session runs on the game server 140. In other embodiments the game session runs elsewhere, e.g. the client 110 within the game mediator 112, or an independent software item upon the client 110 similar to game 114. Where the game runs may depend upon the type of game, such as instant games versus downloadable games as detailed above. In the embodiment of this figure, the game mediator 112 coordinates with the game mediator server 130 to provide game mediation functionality. In other embodiments, game mediation is provided solely by the game mediator 112.

First, client 110A launches 302 the game mediator 112A. For example, the client 110A may open the game mediator 112A as an application, loading it into memory for use. The game mediator 112A communicates with the game mediator server 130 to initiate game mediation. Upon selection 304 of a game A by the client 110A, e.g., using the game mediator 112A, the game mediator 112A communicates with the game mediator server 130 to configure 306 a lobby for game A. In an embodiment, the game mediator 112A and/or game mediator server 130 coordinate to configure the lobby to attain a look and feel of game A as well as to provide intercommunication among clients 110 in the lobby.

The client 110A invites 308 other clients, such as client 110B, using the game mediator 112A. The game mediator 112A facilitates invitation via one or more techniques. For example, the game mediator 112A may send a notification to game mediator 112B upon client 110B, alerting client 110B that client 110A has invited client 110B to a game playing session. In some embodiments the alert includes a textual notification upon client 110B's display. Depending upon the embodiment the notification may be sent via email, telephone call, or text message, or by way of other social networking applications, such as Facebook™, Twitter™, GroupMe™, WhatsApp™, Snapchat™, LinkedIn™, and/or other applications depending upon the embodiment. For example, the game mediator 112A may generate a text message to client 110B that links to the lobby, which client 110A may send using a text message application.

Upon client 110B's acceptance of the invitation, via, for example, sending a request to join the lobby to the game mediator server 130, the game mediator server 130 joins 310 client 110B to the lobby, thus enabling client 110B and client 110A to communicate. For example, the lobby may include a video, audio, and/or textual chatroom with which clients 110 joined to the lobby may communicate. In an embodiment, the lobby updates to indicate that a new client (client 110B) has joined the lobby. This may entail updating a player count, adding a video pane to the lobby, adding a player graphic or icon, and so on.

Client 110A commands game mediator 112A to launch 312 game A. In response, the game mediator 112A commands the game mediator server 130 to check 314, via the game mediator 112 upon each client 110 joined in the lobby, whether the client 110 has game A installed. In the example of FIG. 3, client 110B does not have game A installed. As such, game mediator server 130 sends 316 a deep link to client 110B which, upon receipt, initiates installation 320 of game A upon client 110B. For example, upon receipt of the deep link, client 110B displays a button linking to a download page for game A. In an embodiment, client 110B also displays a graphic and/or textual summary of game A. When the client selects the button, the download page opens (e.g., in a web view within the game mediator 112B) where the client 110B may download and install 320 game A. The download page may be, for example, a page in an application store.

In an embodiment, the game mediator server 130 sends a request to verify installation of the game to each client 110. Upon receipt of the request and verification of installation of the game, each client 110 sends a notification to the game mediator server 130 verifying that the game is installed upon the client 110.

In an embodiment, upon determining each client 110 joined to the lobby is ready for the game playing session to launch, e.g. upon verifying each client 110 having downloaded the game, the game mediator server 130 sends a deep link to each client 110 joined to the lobby linking to a particular point in game A. When a game session is launched, the clients 110 joined to the lobby start the game at that particular point, as specified in the deep link. For example, when the game session is launched, rather than opening the game to a start page, the game opens to an in-game lobby or loadout page. As a second example, when the game session is launched, the game may open to a particular level or location within the game.

Meanwhile, upon determining (via the check 314) that more clients 110 could be invited to the game playing session, the game mediator sever 130 suggests 318 to client 110A, the client 110 that initiated the game playing session, that more invitations be sent to additional clients 110, e.g. via a notification sent to the client 110A. In this example, client 110A declines 322 to invite more players, so game mediator server 130 proceeds to launch 324 a session of game A by communicating with the game server 140. In an embodiment, launching 324 the session of game A involves sending to the game server 140 a set of client identifiers, each client identifier of the set corresponding to a client 110 joined to the lobby. Game server 140 then starts 326 the game playing session. In an embodiment, the game playing session is assigned a session identifier by the game server 140, and the session identifier is used to distinguish the game playing session from other game playing sessions. In such an embodiment, launching the game involves sending the session identifier to each client 110 associated with a client identifier that was received by the game server 140. In this embodiment, clients 110 communicate gameplay instructions to the game server 140 along with the session identifier, and the game server 140 communicates gameplay results to clients 110 using the client identifiers associated with the session. For example, if a first client 110 playing game A swings a sword, the sword swinging gameplay instruction is communicated to the game server 140 along with the session identifier to impact the associated game playing session. Similarly, the gameplay results of the gameplay instruction are communicated to the first client 110, such as graphics to render, audio to play, and/or so on.

Figure 4:
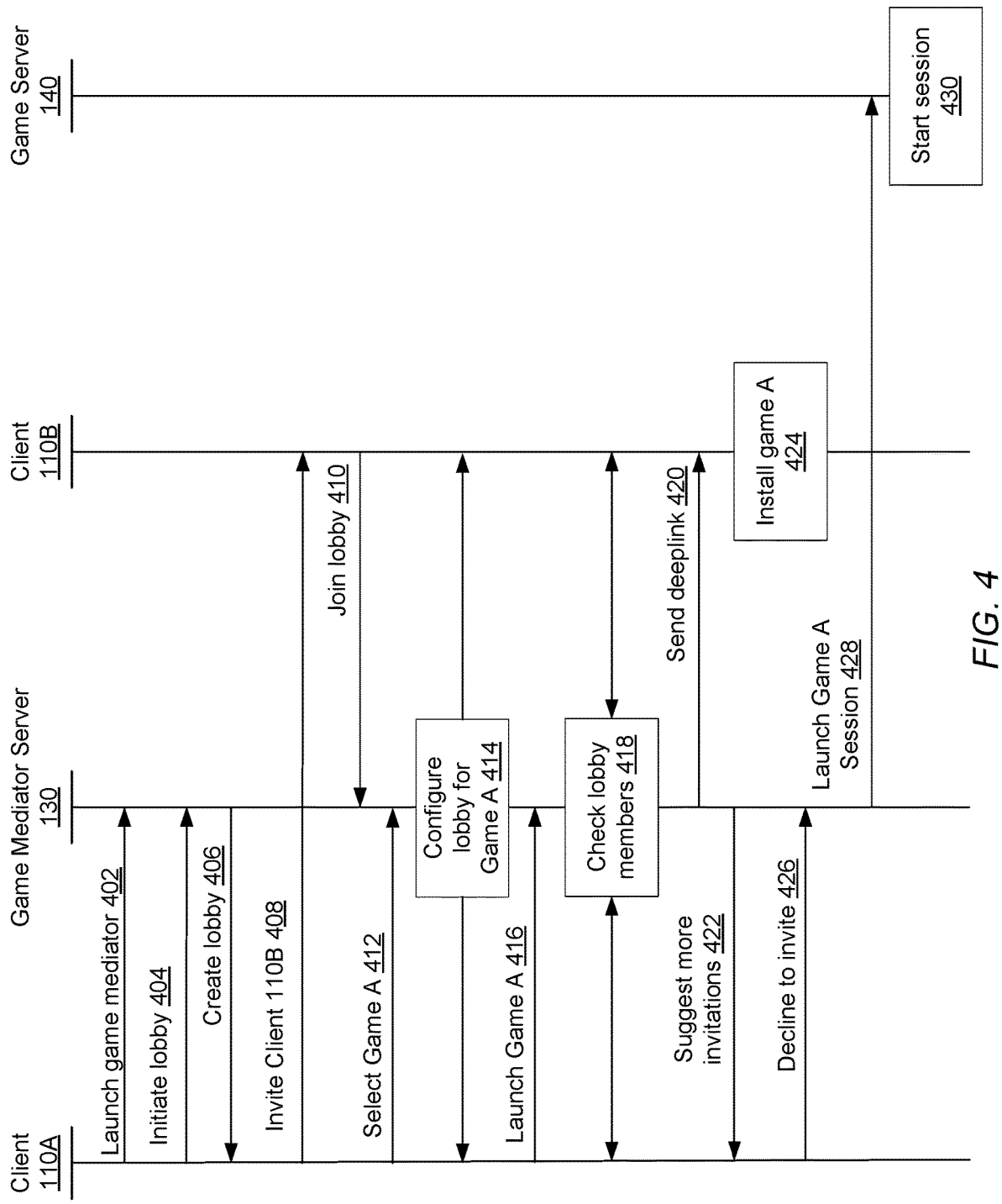
FIG. 4 illustrates the process of launching a multiplayer game playing session using the game mediation system, according to a second embodiment.

FIG. 4 illustrates the process of launching a multiplayer game playing session using the game mediation system, according to a second embodiment in which the lobby is launched before the game is selected. Client 110A launches 402 the game mediator 112A. Client 110A then initiates 404 a lobby, which the game mediator server 130 proceeds to create. Because the lobby is not for a specific game, it is not configured according to any game's look and feel. Instead, the lobby is a generic lobby. For example, the lobby includes video chat frames and one or more icons and/or on-screen buttons, but no particular color scheme or graphics. In an embodiment, the lobby follows a color scheme consistent with other pages of the game mediator 112.

Client 110A, the client 110 that initiated 404 the lobby, then invites 408 client 110B to the lobby. Client 110B accepts the invitation and thereby joins 410 the lobby. Client 110A then selects 412 game A from within the lobby. For example, client 110A selects an on-screen button within the lobby, opening a page listing a plurality of games, from which list the client 110A selects 412. Upon selection 412 of a game—in this example, game A—the game mediator server 130 and/or game mediator 112 configure 414 the lobby for game A to attain a look and feel appropriate for game A.

The process then proceeds similarly to the process of FIG. 3. Client 110A launches 416 a session of game A. The game mediator server 130 and/or game mediator 112 checks 418 the clients 110 joined to the lobby. The game mediator server sends 420 a deep link to client 110B after determining that client 110B does not have the game installed. The game mediator server also suggests 422 to client 110A that the client send more invitations. Client 110B installs 424 game A and client 110A declines 426 to invite additional clients 110. The game mediator server 130 thus launches 428 the session of game A, which prompts the game server 430 to start the game session 430.

In an alternate embodiment, the client 110A launches game mediator 112A and selects a game, which launches a session of the game. In such an embodiment the client 110A may invite other clients 110 to the game session from within the game session, for example, using on-screen buttons of the game mediator 112A overlaying the game session.

Figure 5:
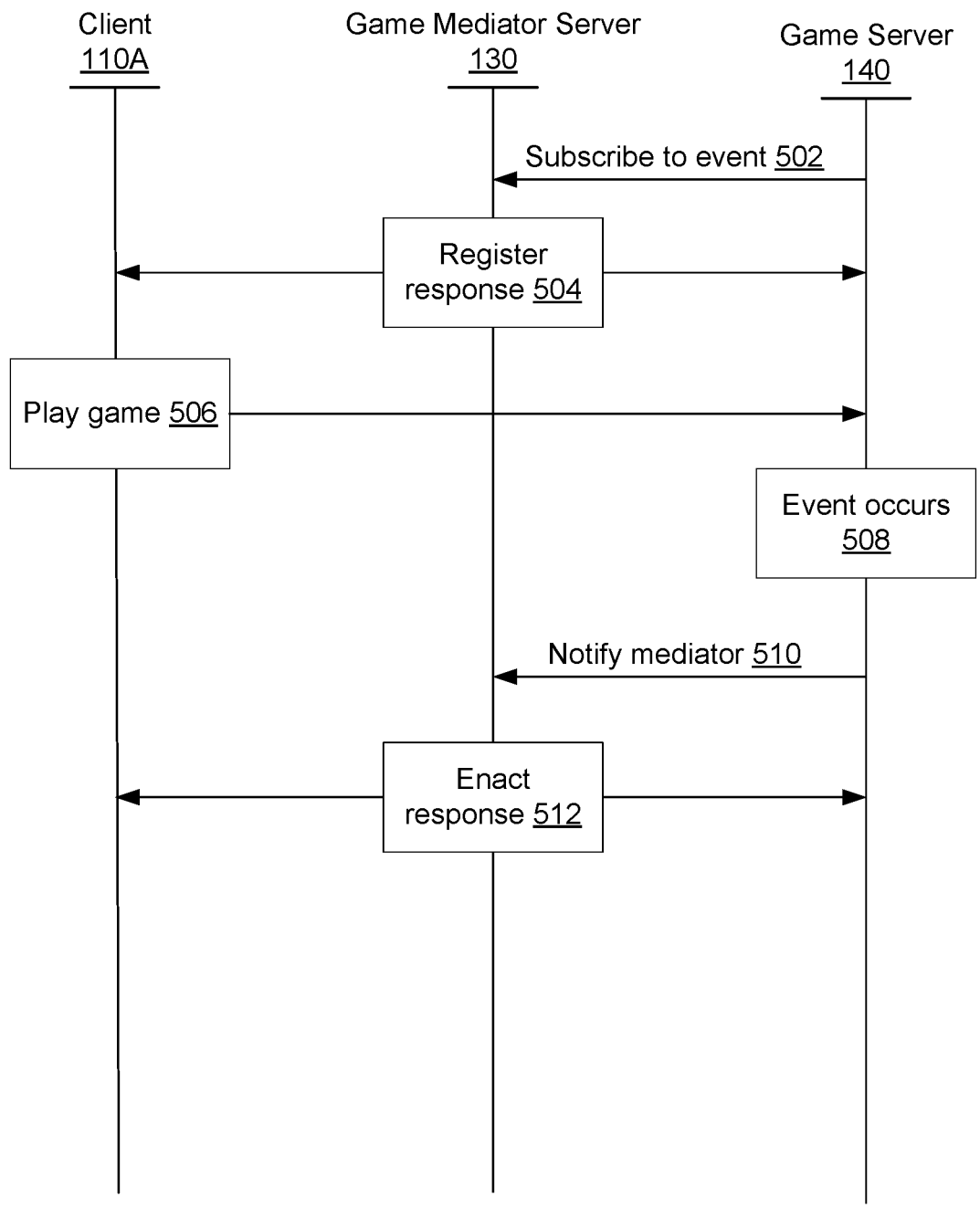
FIG. 5 illustrates a process of enriching multiplayer gameplay using the game mediation system, in one embodiment.

FIG. 5 illustrates the process of enriching multiplayer gameplay using the game mediation system, in one embodiment. First, the game mediator server 130 subscribes 502 to an event within the game playing session, the event occurring on the game server 140 where the game playing session runs. For example, the game mediator server 130 subscribes 502 using the game mediator SDK 230. The event may be flagged via the game mediator SDK 230 as an event that can be subscribed to, for example, and the game may provide to the game mediator server 130a set of events to which the game mediator server 130 may subscribe. The game mediator server 130 registers 504 the appropriate response to the event. For example, a game playing event involving a wolf might prompt the game mediator server 130 to associate a wolf icon, within the lobby, with the client 110 which triggered the event, such as by overlaying an image of a wolf's face upon the user using that particular client 110 within a video of the game session that is displayed within the lobby. The appropriate response to the event may be predetermined by the game, such as a response associated with the event in the set of events.

As a second example, the game mediator server 130 could affect gameplay within the game. For instance, if the user of a particular client 110 participating in a game playing session chooses to overlay an image of a wolf's face upon their image in the lobby, their character within the game could likewise gain a wolf façade. For example, using the game mediator SDK 230 to inform the game that the wolf façade should be placed over the game character. The enrichment process would occur similarly to the process described herein for the in-game event-triggered enrichment.

Next, the client 110 plays 506 the game. During the game playing session, the event occurs 508. The game mediator server is notified 510 by the game server 140 that the event occurred, prompting the game mediator server to enact 512 the appropriate response. In an embodiment, the game playing session is affected rather than, or in addition to, the client 110 who triggered the event. In another embodiment, an event affects one or more clients 110 other than the client 110 which triggered the event. For example, an in-game graphic may be overlaid with a wolf façade rather than a pane in the lobby.

Figure 6:
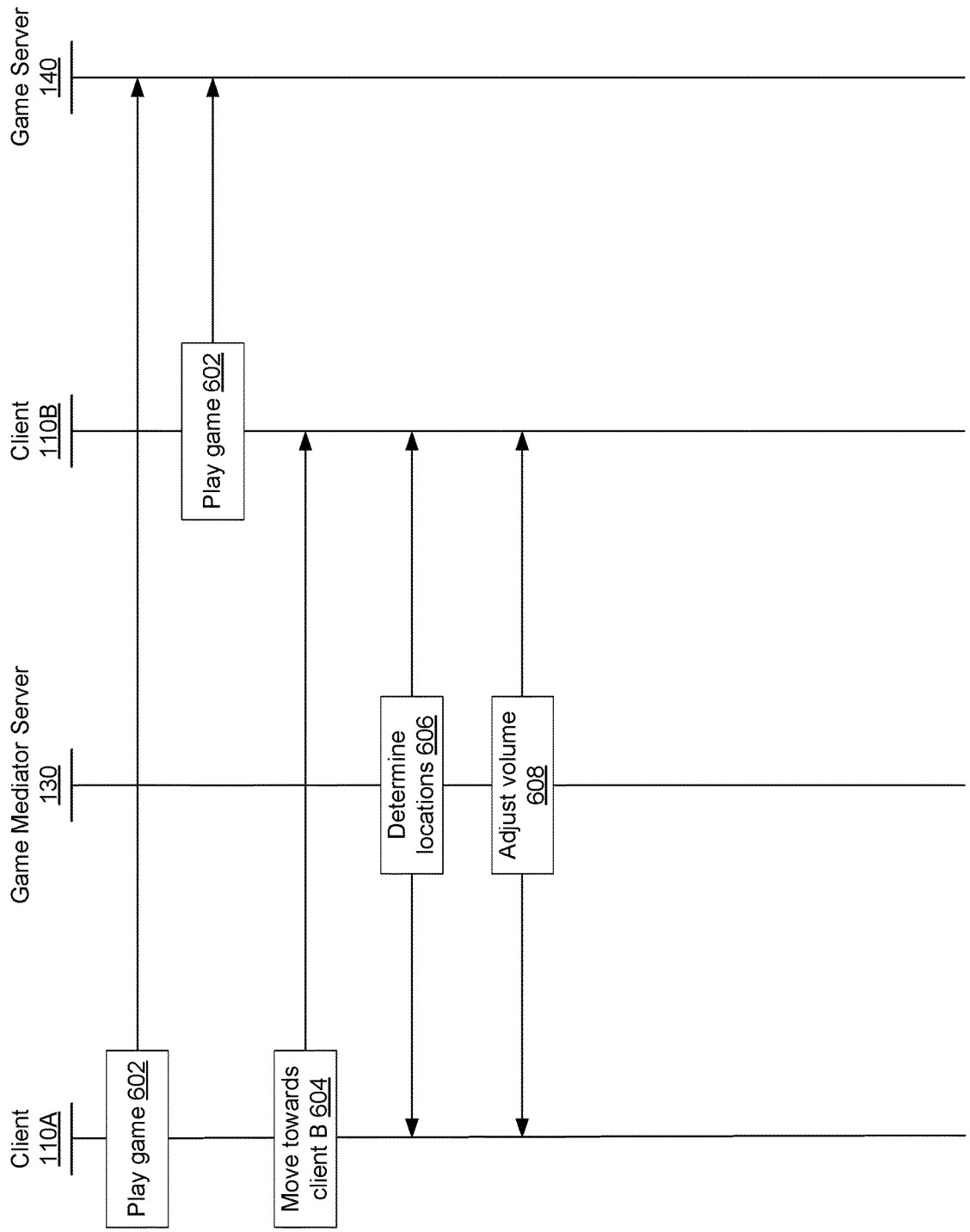
FIG. 6 illustrates the process of enriching multiplayer gameplay using the game mediation system, according to a second embodiment.

FIG. 6 illustrates the process of enriching multiplayer gameplay based on location using the game mediation system, according to a second embodiment. Client 110A and client 110B play 502 a game, as participants in the same game playing session. Client 110A physically moves 504 closer to client 110B, passing within a threshold distance. The game mediator server 130 determines 506 the locations of client 110A and client 110B and identifies that the clients 110 are within the threshold distance of each other. As a result, the game mediator server 130 takes an action, such as adjusting 508 the volume of client 110A and/or client 110B. In an embodiment, adjusting 508 the volume comprises muting one or both clients 110, or specific portions thereof (such as a game background soundtrack, game sound effects, etc.), in order to avoid duplicative sounds in the same geographic area. As used herein, the term "module" refers to computer program logic utilized to provide the specified functionality. Thus, a module can be implemented in hardware, firmware, and/or software.

Other Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method, comprising:
receiving, by a game mediator server, from a first client device, a selection of a game from a plurality of electronic game applications;
configuring, by the game mediator server, a lobby for the selected game based at least in part on a feature of the selected game;
receiving, by the game mediator server, from the first client device, a request to launch a session of the selected game;
determining, by the game mediator server, whether each of the first client device and a second client device included in the session of the game has the game installed, the determining comprising:
sending, by the game mediator server, to each of the first and second client devices, a first deep link to a particular game folder in memory of the respective client device;
wherein the first deep link not leading to a folder existing in memory indicates that the respective client device has not installed the game; and
wherein the first deep link installs the selected game at the respective client device responsive to determining that the respective client device has not installed the game;

verifying, by the game mediator server, that the second client device to which the deep link was sent has installed the selected game; and responsive to the verifying, launching, by the game mediator server, the session of the selected game.

2. The method of claim 1, further comprising:

determining a maximum number of clients for the selected game;

determining whether the maximum number of clients has joined the lobby; and responsive to determining that fewer than the maximum number of clients has joined to the lobby, notifying the first client that the maximum number of clients has not been reached.

3. The method of claim 1, further comprising:

determining a minimum number of clients for the selected game;

determining whether the minimum number of clients has joined the lobby; and responsive to determining that fewer than the minimum number of clients has joined the lobby, notifying the first client that the minimum number of clients has not been reached;

wherein launching the session of the game is responsive to detecting that at least the minimum number of clients has joined the lobby.

4. The method of claim 1, wherein configuring the lobby for the selected game based at least in part on at least one feature of the selected game comprises configuring the lobby based at least in part on at least one of a set of textual elements and a set of graphical elements;

wherein the set of textual elements comprises at least one of a logo, a title, and a game summary; and wherein the set of graphical elements comprises at least one of an icon, an image, and a button.

5. The method of claim 1, wherein launching the session of the game comprises:

receiving from the first client device a selection of a portion of the game; and responsive to the selection of the portion of the game, launching the session of the game at the selected portion of the game.

6. The method of claim 1, further comprising:

receiving, from a third client device, a request to view a live video feed of the session of the game; and sending, to the third client device, a live video feed of the session of the game.

7. The method of claim 1, wherein launching the session of the game further comprises:

sending, to a game server, for each client joined to the lobby, a user identifier;

receiving, from the game server, a game session identifier; and sending, to each client joined to the lobby, the game session identifier.

8. A system, comprising:

a processor; and a non-transitory computer-readable storage medium storing computer program instructions executable by the processor to perform operations, the operations comprising:

receiving, by a game mediator server, from a first client device, a selection of a game from a plurality of electronic game applications;

configuring, by the game mediator server, a lobby for the selected game based at least in part on a feature of the selected game;

receiving, by the game mediator server, from the first client device, a request to launch a session of the selected game;

determining, by the game mediator server, whether each of the first client device and a second client device included in the session of the game has the game installed, the determining comprising:

sending, by the game mediator server, to each of the first and second client devices, a first deep link to a particular game folder in memory of the respective client device;

wherein the first deep link not leading to a folder existing in memory indicates that the respective client device has not installed the game; and wherein the first deep link installs the selected game at the respective client device responsive to determining that the respective client device has not installed the game;

verifying, by the game mediator server, that the second client device to which the deep link was sent has installed the selected game; and responsive to the verifying, launching, by the game mediator server, the session of the selected game.

9. The system of claim 8, the operations further comprising:

determining a maximum number of clients for the selected game;

determining whether there are the maximum number of clients joined to the lobby; and responsive to determining that fewer than the maximum number of clients has joined to the lobby, notifying the first client that the maximum number of clients has not been reached.

10. The system of claim 8, the operations further comprising:

determining a minimum number of clients for the selected game;

determining whether there are the minimum number of clients joined to the lobby; and responsive to determining there are not the minimum number of clients joined to the lobby, notifying the first client that the minimum number of clients has not been reached;

wherein launching the session of the game is responsive to detecting that at least the minimum number of clients are joined to the lobby.

11. The system of claim 8, wherein configuring the lobby for the selected game based at least in part on at least one feature of the selected game comprises configuring the lobby based at least in part on at least one of a set of textual elements and a set of graphical elements;

wherein the set of textual elements comprises at least one of a logo, a title, and a game summary; and wherein the set of graphical elements comprises at least one of an icon, an image, and a button.

12. The system of claim 8, wherein launching the session of the game comprises:

receiving from the first client device a selection of a portion of the game; and responsive to the selection of the portion of the game, launching the session of the game at the selected portion of the game.

13. The system of claim 8, the operations further comprising:

receiving, from a third client device, a request to view a live video feed of the session of the game; and sending, to the third client device, a live video feed of the session of the game.

14. The system of claim 8, wherein launching the session of the game further comprises:
   sending, to a game server, for each client joined to the lobby, a user identifier;
   receiving, from the game server, a game session identifier; and
   sending, to each client joined to the lobby, the game session identifier.

15. A non-transitory computer-readable storage medium storing computer program instructions executable by a processor to perform operations comprising:
   receiving, by a game mediator server, from a first client device, a selection of a game from a plurality of electronic game applications;
   configuring, by the game mediator server, a lobby for the selected game based at least in part on a feature of the selected game;
   receiving, by the game mediator server, from the first client device, a request to launch a session of the selected game;
   determining, by the game mediator server, whether each of the first client device and a second client device included in the session of the game has the game installed, the determining comprising:
      sending, by the game mediator server, to each of the first and second client devices, a first deep link to a particular game folder in memory of the respective client device;
      wherein the first deep link not leading to a folder existing in memory indicates that the respective client device has not installed the game; and
      wherein the first deep link installs the selected game at the respective client device responsive to determining that the respective client device has not installed the game;
   verifying, by the game mediator server, that the second client device to which the deep link was sent has installed the selected game; and
   responsive to the verifying, launching, by the game mediator server, the session of the selected game.

16. The non-transitory computer-readable storage medium of claim 15, the operations further comprising:
   determining a maximum number of clients for the selected game;
   determining whether the maximum number of clients has joined the lobby; and
   responsive to determining that fewer than the maximum number of clients has joined to the lobby, notifying the first client that the maximum number of clients has not been reached.

17. The non-transitory computer-readable storage medium of claim 15, the operations further comprising:
   determining a minimum number of clients for the selected game;
   determining whether the minimum number of clients has joined the lobby; and
   responsive to determining that fewer than the minimum number of clients has joined the lobby, notifying the first client that the minimum number of clients has not been reached;
   wherein launching the session of the game is responsive to detecting that at least the minimum number of clients has joined the lobby.

18. The non-transitory computer-readable storage medium of claim 15, wherein configuring the lobby for the selected game based at least in part on at least one feature of the selected game comprises configuring the lobby based at least in part on at least one of a set of textual elements and a set of graphical elements;
   wherein the set of textual elements comprises at least one of a logo, a title, and a game summary; and
   wherein the set of graphical elements comprises at least one of an icon, an image, and a button.

19. The non-transitory computer-readable storage medium of claim 15, wherein launching the session of the game comprises:
   receiving from the first client device a selection of a portion of the game; and
   responsive to the selection of the portion of the game, launching the session of the game at the selected portion of the game.

20. The non-transitory computer-readable storage medium of claim 15, the operations further comprising:
   receiving, from a third client device, a request to view a live video feed of the session of the game; and
   sending, to the third client device, a live video feed of the session of the game.

* * * * *